US010460226B2

United States Patent
Wei et al.

(10) Patent No.: US 10,460,226 B2
(45) Date of Patent: Oct. 29, 2019

(54) TIRE HAVING RADIO FREQUENCY IDENTIFICATION DEVICE FOR MONITORING STRUCTURAL HEALTH

(71) Applicant: Bridgestone Americas Tire Operations, LLC, Nashville, TN (US)

(72) Inventors: Terence E. Wei, Copley, OH (US); Paul B. Wilson, Tallmadge, OH (US)

(73) Assignee: Bridgestone Americas Tire Operations, LLC, Nashville, TN (US)

(*) Notice: Subject to any disclaimer, the term of this patent is extended or adjusted under 35 U.S.C. 154(b) by 222 days.

(21) Appl. No.: 15/538,238

(22) PCT Filed: Nov. 13, 2015

(86) PCT No.: PCT/US2015/060513
§ 371 (c)(1),
(2) Date: Jun. 21, 2017

(87) PCT Pub. No.: WO2016/105687
PCT Pub. Date: Jun. 30, 2016

(65) Prior Publication Data
US 2017/0357887 A1  Dec. 14, 2017

Related U.S. Application Data

(60) Provisional application No. 62/096,060, filed on Dec. 23, 2014.

(51) Int. Cl.
*G01B 3/44* (2006.01)
*G06K 19/077* (2006.01)
(Continued)

(52) U.S. Cl.
CPC ........ *G06K 19/07764* (2013.01); *B60C 11/24* (2013.01); *B60C 11/243* (2013.01);
(Continued)

(58) Field of Classification Search
None
See application file for complete search history.

(56) References Cited

U.S. PATENT DOCUMENTS

| 4,550,385 A | 10/1985 | Pulk et al. |
| 4,574,267 A | 3/1986 | Jones et al. |
| (Continued) | | |

FOREIGN PATENT DOCUMENTS

| EP | 1522425 | 4/2005 |
| FR | 2936977 | 4/2010 |
| JP | 4204833 | 1/2009 |

OTHER PUBLICATIONS

Bae, Guen Tae; International Search Report and Written Opinion of corresponding PCT Application No. PCT/US2015/064513; dated Feb. 12, 2016; Korean Intellectual Property Office; Daejeon, Republic of Korea.

(Continued)

Primary Examiner — Aditya S Bhat

(57) ABSTRACT

A tire includes a plurality of tire components defining a plurality of layers. A radio frequency identification (RFID) tag is disposed between at least two of the plurality of layers. The RFID tag is in contact with each of the at least two layers and is configured to transmit a response signal in response to receiving a request signal. When no air is in a region surrounding the RFID tag, a first response signal is emitted from the tire at a first frequency and first power. However, when air is in the region surrounding the RFID tag, a second response signal is emitted from the tire at the first frequency and a second power different from the first power.

13 Claims, 4 Drawing Sheets

(51) Int. Cl.
  *B60C 23/04* (2006.01)
  *H01Q 1/22* (2006.01)
  *H01Q 1/32* (2006.01)
  *B60C 11/24* (2006.01)
  *B60C 19/00* (2006.01)

(52) U.S. Cl.
  CPC ........ *B60C 11/246* (2013.01); *B60C 23/0444* (2013.01); *B60C 23/0493* (2013.01); *H01Q 1/2241* (2013.01); *H01Q 1/325* (2013.01); *B60C 2019/004* (2013.01); *B60C 2019/007* (2013.01)

(56) References Cited

U.S. PATENT DOCUMENTS

| | | | |
|---|---|---|---|
| 4,630,470 A | 12/1986 | Brooke et al. | |
| 4,911,217 A | 3/1990 | Dunn et al. | |
| 6,879,938 B2 | 4/2005 | Asano et al. | |
| 6,921,197 B2 | 7/2005 | Aubel et al. | |
| 6,988,026 B2 | 1/2006 | Breed et al. | |
| 7,009,576 B2 | 3/2006 | Adamson et al. | |
| 7,015,801 B1 | 3/2006 | Juzswik | |
| 7,032,436 B2 | 4/2006 | Yokota et al. | |
| 7,034,660 B2 | 4/2006 | Watters et al. | |
| 7,050,017 B2 | 5/2006 | King et al. | |
| 7,095,311 B2 | 8/2006 | Coates et al. | |
| 7,103,460 B1 | 9/2006 | Breed | |
| 7,116,213 B2 | 10/2006 | Thiesen et al. | |
| 7,180,409 B2 | 2/2007 | Brey | |
| 7,203,579 B2 | 4/2007 | Yokota et al. | |
| 7,205,886 B2 | 4/2007 | Kin | |
| 7,292,138 B2 | 11/2007 | Jang | |
| 7,316,251 B2 | 1/2008 | Kogure et al. | |
| 7,320,246 B2 | 1/2008 | Schick et al. | |
| 7,385,492 B2 | 6/2008 | Hattori | |
| 7,421,321 B2 | 9/2008 | Breed | |
| 7,595,721 B2 | 9/2009 | Shinmura | |
| 7,775,094 B2 | 8/2010 | Awad | |
| 7,954,367 B2 * | 6/2011 | Mancosu | B60C 23/0493 73/146 |
| 8,371,159 B2 | 2/2013 | Morinaga | |
| 8,380,389 B2 | 2/2013 | Wright et al. | |
| 8,397,559 B2 | 3/2013 | Fischer et al. | |
| 8,634,983 B2 | 1/2014 | Irth et al. | |
| 2002/0116992 A1 | 8/2002 | Rickel | |
| 2004/0061601 A1 | 4/2004 | Freakes et al. | |
| 2005/0093761 A1 | 5/2005 | King et al. | |
| 2006/0042734 A1 | 3/2006 | Turner et al. | |
| 2006/0208902 A1 | 9/2006 | Brey | |
| 2008/0278288 A1 | 11/2008 | O'Brien | |
| 2010/0090013 A1 | 4/2010 | Jung et al. | |
| 2010/0122757 A1 | 5/2010 | Lionetti et al. | |
| 2010/0319446 A1 | 12/2010 | Coue | |
| 2011/0260834 A1 | 10/2011 | Chapman et al. | |
| 2012/0028680 A1 | 2/2012 | Breed | |
| 2012/0053849 A1 | 3/2012 | Followell | |
| 2013/0025751 A1 | 1/2013 | Dassano et al. | |

OTHER PUBLICATIONS

Ergen, S.C. et al.; The Tire as an Intelligent Sensor; Computer-Aided Design of Integrated Circuits and Systems, IEEE Transactions on , vol. 28, No. 7, pp. 941,955, Jul. 2009doi: 10.1109/TCAD.2009.2022879.

European Search Report; Corresponding European Application No. 15873911.0; Alain Gaillard; dated Jun. 26, 2018.

* cited by examiner

TIRE HAVING RADIO FREQUENCY IDENTIFICATION DEVICE FOR MONITORING STRUCTURAL HEALTH

FIELD OF INVENTION

The present disclosure is directed to tires featuring radio frequency identification (RFID) devices and methods of using and providing RFIDs in tire applications. More particularly, the present disclosure is directed to tires having RFIDs for sensing internal cracks or voids in the tire structure. The tires may be pneumatic or non-pneumatic.

BACKGROUND

Known RFID devices feature chips and antennas and are used for identification and memory storage purposes. In this regard, known RFID devices may be read-only, write-only, or read-and-write devices. Information is transmitted to or from RFID devices through antennas. The information is transmitted at a desired frequency that depends, in part, on the length of the antenna. RFID devices may be employed in tires to store and transmit information related to the tire.

SUMMARY OF THE INVENTION

In one embodiment, a tire structural health monitoring assembly includes a tire having a plurality of components. The plurality of components include a pair of annular beads, a body ply extending between the annular beads, and a circumferential belt disposed above the body ply and extending axially across a portion of the body ply. The tire also includes a circumferential tread disposed above the circumferential belt, a pair of shoulders extending from opposite sides of the circumferential tread, and a pair of sidewalls. Each sidewall extends between one of the annular beads and one of the shoulders. The assembly further includes at least one RFID tag disposed between two components of the tire, wherein the RFID tag is in contact with each of the two components. The assembly also includes an RFID reader configured to receive a response signal from the RFID tag. When no air is present in a region surrounding the RFID tag, the RFID reader receives a response signal at a first frequency and a first power level. When air is present in the region surrounding the RFID tag, however, the RFID reader receives a response signal at the first frequency and a second power level different from the first power level. The assembly further includes a processor configured to identify the power level of a response signal received by the RFID reader at the first frequency. The processor transmits a notification when the power level of the response signal is outside a pre-determined range.

In another embodiment, a tire includes a plurality of tire components defining a plurality of layers. An RFID tag is disposed between at least two of the plurality of layers. The RFID tag is in contact with each of the at least two layers and is configured to transmit a response signal in response to receiving a request signal. When no air is in a region surrounding the RFID tag, a first response signal is emitted from the tire at a first frequency and first power. However, when air is in the region surrounding the RFID tag, a second response signal is emitted from the tire at the first frequency and a second power different from the first power.

In yet another embodiment, a method for sensing tire structural health includes providing a tire having tire structure and providing an RFID tag within the tire structure. The method also includes directing a signal toward the RFID tag and receiving a response from the RFID tag. The response has a first frequency and a first power. The method further includes correlating at least one of the first power and first frequency of the response to a structural health status of the tire.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

The following includes definitions of selected terms employed herein. The definitions include various examples and/or forms of components that fall within the scope of a term and that may be used for implementation. The examples are not intended to be limiting. Both singular and plural forms of terms may be within the definitions.

"Axial" and "axially" refer to a direction that is parallel to the axis of rotation of a tire.

"Circumferential" and "circumferentially" refer to a direction extending along the perimeter of the surface of the tread perpendicular to the axial direction.

"Equatorial plane" refers to the plane that is perpendicular to the tire's axis of rotation and passes through the center of the tire's tread.

"Radial" and "radially" refer to a direction perpendicular to the axis of rotation of a tire.

"Sidewall" refers to that portion of the tire between the tread and the bead.

"Tread" refers to that portion of the tire that comes into contact with the road or ground under normal inflation and normal load.

Directions are stated herein with reference to the axis of rotation of the tire. The terms "upward" and "upwardly" refer to a general direction towards the tread of the tire, whereas "downward" and "downwardly" refer to the general direction towards the axis of rotation of the tire. Thus, when relative directional terms such as "upper" and "lower" or "top" and "bottom" are used in connection with an element, the "upper" or "top" element is spaced closer to the tread than the "lower" or "bottom" element. Additionally, when relative directional terms such as "above" or "below" are used in connection with an element, an element that is "above" another element is closer to the tread than the other element.

The terms "inward" and "inwardly" refer to a general direction towards the equatorial plane of the tire, whereas "outward" and "outwardly" refer to a general direction away from the equatorial plane of the tire and towards the sidewall of the tire. Thus, when relative directional terms such as "inner" and "outer" are used in connection with an element, the "inner" element is spaced closer to the equatorial plane of the tire than the "outer" element.

While similar terms used in the following descriptions describe common tire components, it is understood that because the terms carry slightly different connotations, one of ordinary skill in the art would not consider any one of the following terms to be purely interchangeable with another term used to describe a common tire component.

Figure 1:
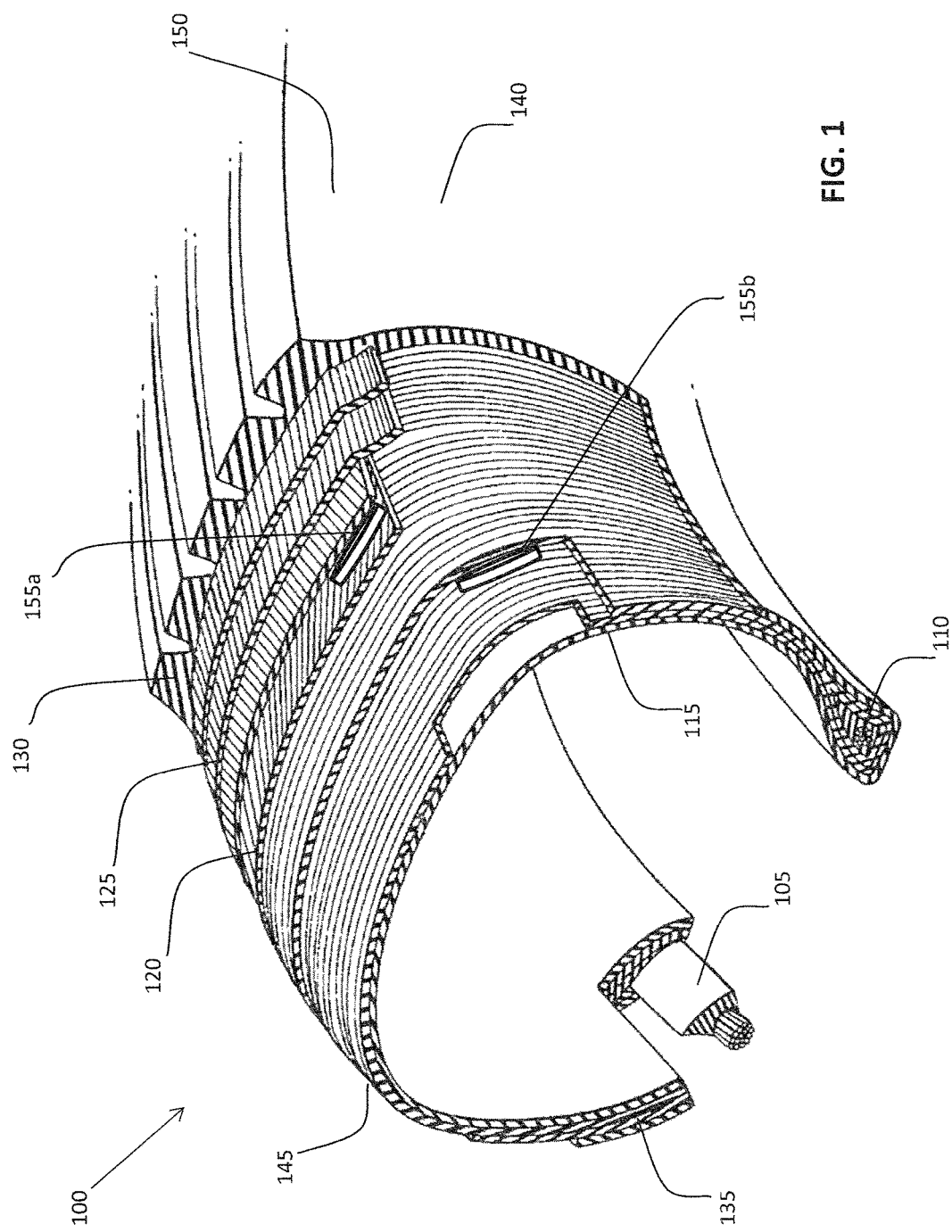
FIG. 1 is a peel-away cross-sectional perspective view of one embodiment of a tire featuring a plurality of RFID tags.

FIG. 1 is a peel-away cross-sectional perspective view of one embodiment of a new tire 100. As shown, tire 100 features a first annular bead 105 and a second annular bead 110. The annular beads, in part, secure the tire to a wheel. In an alternative embodiment (not shown), the tire comprises four or more beads.

The tire 100 further features a body ply 115 extending between the first annular bead 105 and the second annular bead 110. The body ply 115 forms an annulus and imparts shape to the tire. As one of ordinary skill in the art will understand, the body ply 115 may contain reinforcing cords or fabric. In alternative embodiments (not shown), various turn-up and turn-down configurations, or multiple body plies, are used.

The tire 100 further includes a pair of circumferential belts 120. The circumferential belts 120 are disposed radially outward of body ply 115 and extend axially across a portion of body ply 115. The circumferential belts 120 may contain steel cords and reinforcing cords. In an alternative embodiment (not shown), the circumferential belt lacks metal. While the illustrated embodiment shows two circumferential belts, in an alternative embodiment, a single belt is employed. In another alternative embodiment, three or more belts are employed.

Reinforcing plies (or cap plies) 125 are disposed above the circumferential belts 120. The reinforcing plies may be constructed of nylon or another polymeric material. While the illustrated embodiment shows two reinforcing plies, in an alternative embodiment, a single reinforcing ply is employed. In another alternative embodiment, three or more reinforcing plies are employed.

The tire 100 further includes a circumferential tread 130 disposed above the circumferential belt 120 and the reinforcing plies 125. The circumferential tread 130 extends axially across a portion of body ply 115. In the illustrated embodiment, the tread 130 includes a plurality of circumferential grooves that divide the tread into a plurality of ribs. In alternative embodiments, the tread may include blocks that are defined by circumferential and lateral grooves, or lugs that are defined by voids. It should be understood that the circumferential tread may also include sipes, angled grooves, studs, laminates, and other tread elements.

As one of ordinary skill in the art will understand, circumferential tread 130 is affixed to the tire 100 when the tire 100 is new. The circumferential tread may also be affixed to a tire carcass through a retread process.

The tire 100 further comprises a first sidewall 135 and a second sidewall 140. The first sidewall 135 extends between the first annular bead 105 and a first shoulder 145, which is proximately associated with an edge of circumferential tread 130. The second sidewall 140 extends between the second annular bead 110 and a second shoulder 150, which is proximately associated with an opposite edge of circumferential tread 130. In an alternative embodiment (not shown), the sidewall is proximately associated with an undertread.

While FIG. 1 illustrates some elements of a tire, it should be understood that any number of additional elements may be employed. For example, reinforcement elements may be employed in a shoulder region, a tread region, a sidewall region, or a bead region of a tire. Additionally, an abrasion portion may be employed in a bead region, and the bead region may include additional fillers.

The tire 100 further comprises a plurality of radio frequency identification (RFID) devices 155a,b. The RFID devices may also be referred to as tags or chips, and include at least one antenna for transmitting radio frequency signals. The antenna may be internal to the device, or external. In one known embodiment, the antenna is a dipole antenna that extends from opposite ends of the device. The RFID devices 155a,b are enlarged in FIG. 1 for illustrative purposes.

In one embodiment, the RFID devices are active RFID tags that include a power source. In an alternative embodiment, the RFID devices are passive RFID tags that receive energy that is transferred from an RFID reader through electromagnetic waves.

In the illustrated embodiment, a first RFID tag 155a is disposed radially between two circumferential belts 120 in the tread region of the tire, and a second RFID tag 155b is disposed between two body plies 115 in the first shoulder region 140 of the tire 100. In alternative embodiments, any number of RFID tags may be employed. Because the RFID tags may be used to monitor the structural health of a tire, it may be advantageous to employ multiple RFID tags between various layers. For example, RFID tags may be employed between a belt and a body ply, between a belt and a cap ply, between a retread and a tire carcass, between a body ply and a bead filler, or between any reinforcement element and an adjacent element. Additionally, multiple RFID tags may be employed at different locations between the same two components. For example, multiple RFID tags may be employed between two circumferential belts at a plurality of axial locations and at a plurality of circumferential locations.

While a pneumatic tire is shown in FIG. 1, the RFID devices may also be employed in a non-pneumatic tire. The basic structure of non-pneumatic tires is known in the art, and is not presented here.

Figure 2:
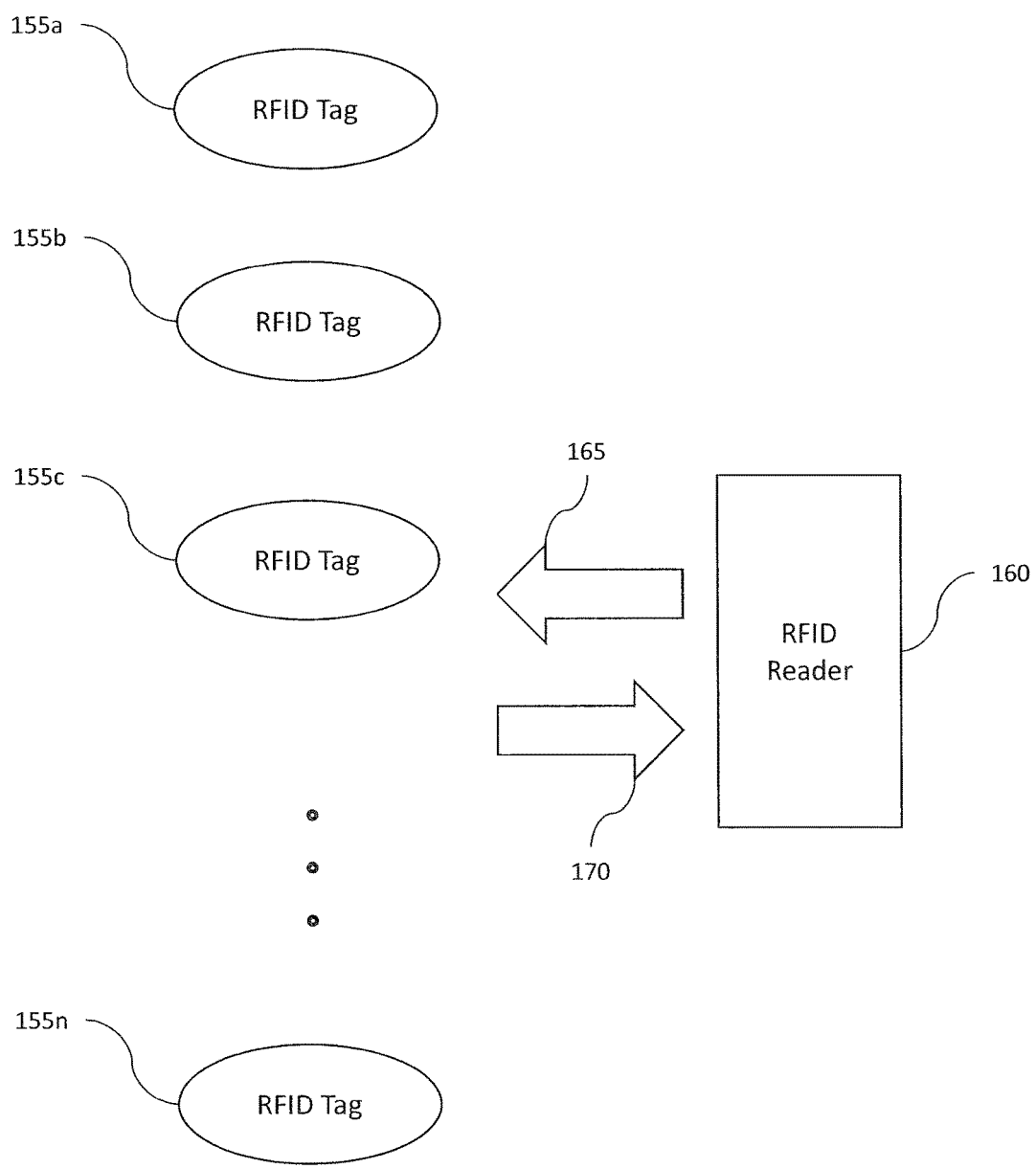
FIG. 2 is a schematic drawing showing communication between a plurality of RFID tags and an RFID reader.

FIG. 2 is a schematic drawing showing communication between a plurality of RFID tags 155 and an RFID reader 160. In one embodiment, the RFID reader 160 is a handheld device. In an alternative embodiment, the RFID reader may be mounted on a vehicle, proximate to a mounted tire containing RFID tags. In another alternative embodiment, the RFID reader may be a stationary device. For example, the RFID reader may be located on a post that a vehicle drives past.

In the illustrated embodiment, a plurality of RFID tags 155a-n are in signal communication with a single RFID reader 160. Alternatively, multiple RFID readers may be employed. The RFID reader 160 transmits a request signal 165 to one or more of the RFID tags 155. The request signal includes a request for the RFID tag 155 to transmit a response signal 170. In embodiments where passive RFID tags are employed, the request signal includes sufficient energy to power the passive RFID tags.

The response signal 170 may include data related to the tire, such as a tire identifier, a tire factory identifier, a manufacture date, an installation date, and any other data that may be relevant for a user. Alternatively, the response signal may include data related to the RFID tag, such as a serial number. In such instances, the serial number may be associated with a specific tire and associated tire data in a lookup table. In another alternative embodiment, the response signal does not include any data, but is only used by the RFID reader for the purpose of identifying the power and frequency of the signal.

In one embodiment, the RFID reader 160 includes a processor (not shown) that processes data received from a response signal 170. Such processing may include, without limitation, parsing data from a signal, identifying data from a signal, checking a checksum from a signal, decrypting data that is encrypted, or storing data. The processing may also include identifying a frequency or a power level of a signal, and comparing these values to expected frequency or power levels. In an alternative embodiment, the RFID reader 160 does not include a processor that processes data received from a response signal 170. Instead, the RFID reader transmits the received data to an external processor. For example, if the RFID reader is mounted on a vehicle, the RFID reader may transmit the data to a processor that is connected to a visual display on a dashboard of the vehicle.

In one embodiment, the request signal 165 is transmitted at a first frequency and the response signal 170 is transmitted at the same first frequency. In an alternative embodiment, the request signal 165 is transmitted at a first frequency and the response signal 170 is transmitted at a second frequency that is different from the first frequency. In another alternative embodiment, one or more of the request signal 165 and the response signal 170 are transmitted at multiple frequencies. For example, a first request signal may be transmitted at a first frequency and a first response signal is transmitted at the same first frequency, then a second request signal may be transmitted at a second frequency and a second response signal is transmitted at the same second frequency. As another example, the request signal may be transmitted across a spectrum of frequencies and the response signal may also be transmitted across a spectrum of frequencies.

Figure 3:
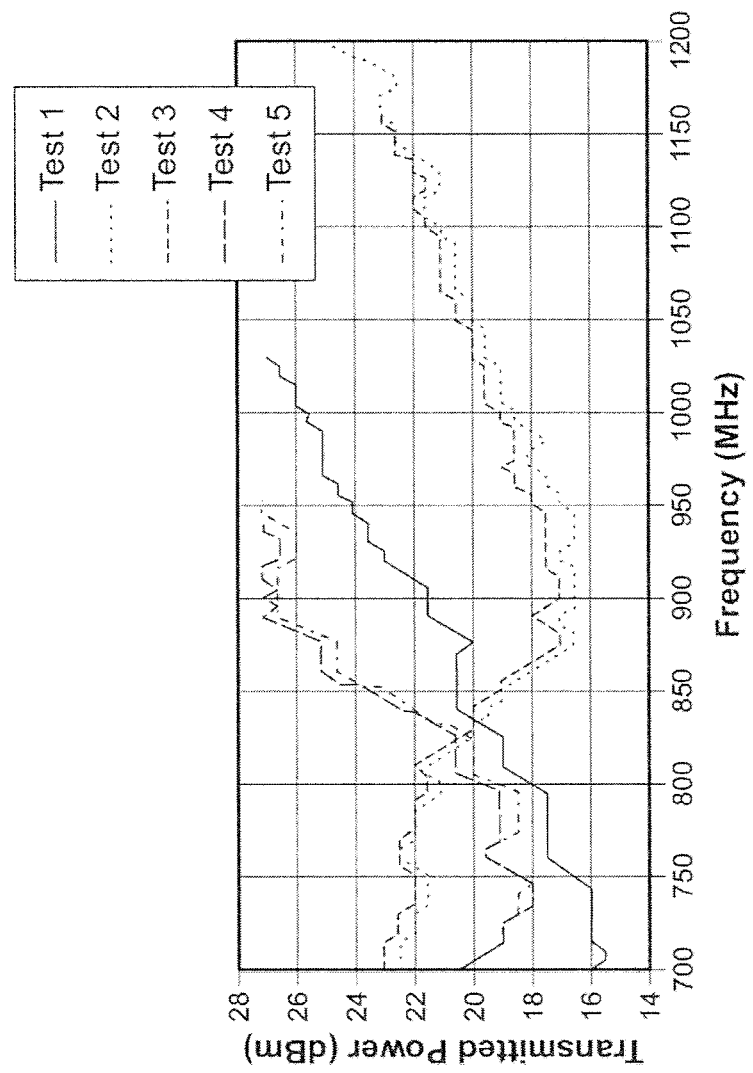
FIG. 3 is a graph showing frequency and power of responses from a plurality of RFID tags.

FIG. 3 is a graph 200 showing frequency and power of responses from a plurality of RFID tags. In the illustrated embodiment, the x-axis represents the frequency of a signal and is shown in megahertz. Additionally, the y-axis represents the power of a signal and is shown in decibel-milliwatts.

The graph 200 illustrates a series of five different tests. The solid line identified as Test 1 represents a signal received by an RFID reader that was emitted through a tire by a tag embedded in a first location, with no air present in a region surrounding the tag. The lower dashed and dotted lines identified as Test 2 and Test 3 represent examples of signals received by the RFID reader when air is present in a region surrounding the tags. The presence of air may be caused by cracks or other voids in a tire component or between two tire components. The upper dashed and dotted lines identified as Test 4 and Test 5 represent examples of other signals received by the RFID reader when air is present in a region surrounding the tag.

As the graph 200 demonstrates, when a given RFID tag transmits a signal from inside of a tire, the received signal will have a different power for a given frequency if air is present in a region surrounding the tag, compared to a tag that transmits from the same region of the tire when no air is present. Accordingly, the characteristics of the signal from an RFID tag may be used to detect the presence of cracks or voids in a tire. Moreover, the size of the void in the tire and the location of the void relative to the RFID tag will affect the propagation of the signal through the tire, and how the signal is received by the RFID reader. For this reason, even though the lower lines from Test 2 and Test 3 and the upper lines from Test 4 and Test 5 all represent signals received from tags located in regions where air was present, the location of the void relative to each tag caused the lines from these tests to diverge.

A given void may cause large power changes to a signal at a first frequency, but only cause minimal power changes to a signal at a second frequency. For example, as shown in graph 200, an RFID reader will receive a signal of 21 dBm at a frequency of 900 MHz when no air is present in a region surrounding a tag (see Test 1), but may receive a signal of 17 dBM at a frequency of 900 MHz in one instance when air is present in a region surrounding the tag (see Test 2 and Test 3), or it may receive a signal of 26 dBM at a frequency of 900 MHz in another instance when air is present in a region surrounding the tag (see Test 4 and Test 5). However, as further shown by the graph 200, the RFID reader will receive a signal of 20 dBM at a frequency of 830 MHz from a tag when no air is present in a region surrounding the tag (see Test 1) or when air is present in a region surrounding the tag (see Tests 2-5).

To account for the fact that the presence of air in a region may not cause power discrepancies to appear at every frequency, it may be desirable for an RFID tag to transmit at a plurality of frequencies, and for the RFID reader to read the response signals at a plurality of frequencies. Alternatively, multiple RFID tags may be employed at a plurality of locations. When multiple RFID tags are employed, even if they are all transmitting at the same frequency, the characteristics of a region surrounding a first RFID tag may cause a power discrepancy even if those same characteristics do not cause a power discrepancy in a signal from a nearby second RFID tag.

If the RFID reader identifies a power discrepancy in a response signal, it may transmit a notification. Such a notification may alert a user that the tire may have cracks or voids, or is in need of further inspection or replacement. For example, when the RFID reader is mounted to a vehicle, a processor may be connected to a dashboard indicator that can notify the driver that the tire is in need of further inspection. The indicator may be a simple light, a message on a computer screen, an audible indication, or any other indicator.

Figure 4:
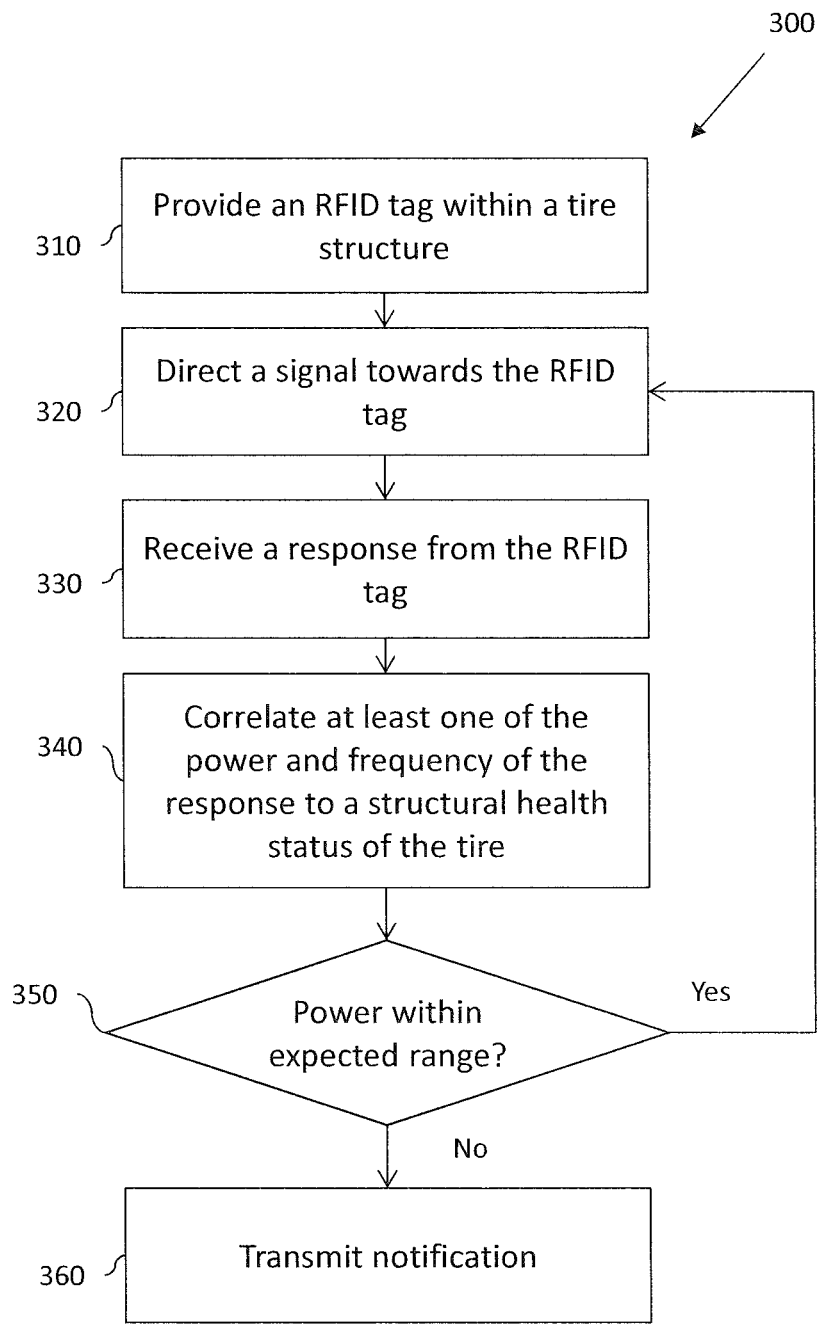
FIG. 4 is a flow chart showing one embodiment of a method for sensing tire structural health.

FIG. 4 is a flow chart 300 showing one embodiment of a method for sensing tire structural health. The method includes providing an RFID tag within a tire structure (310) and directing signal toward the RFID tag (320). The method further includes receiving a response from the RFID tag (330). The method also includes correlating at least one of the power and frequency of the response to a structural health status of the tire (340). If the power of the response is outside an expected range for a given frequency (350), a notification is transmitted to a user (360). However, if the power of the response is within an expected range for a given frequency (350), no notification needs to be transmitted. Instead, steps 320-340 may be repeated.

The repeating of steps 320-340 may be performed on the same RFID tag at the same frequency. Alternatively, the repeating of steps 320-340 may be performed on a different RFID tag at the same frequency. As another alternative, the repeating of steps 320-340 may be performed on the same RFID tag at a different frequency. As yet another alternative, the repeating of steps 320-340 may be performed on a different RFID tag at a different frequency.

In correlating the power and frequency of the response to a structural health status of the tire, the processor may also determine the location of the RFID tag, based on location data transmitted in the response signal. For example, it may be expected that an RFID reader will receive a signal at a first power level for a given frequency from an RFID tag in a tread region of the tire, and receive a signal at a second power level for the same frequency from an RFID tag in a bead region of the tire.

As one of ordinary skill in the art would understand, the tire embodiments described in this disclosure may be configured for use on a vehicle selected from the group consisting of motorcycles, tractors, agricultural vehicles, lawnmowers, golf carts, scooters, airplanes, military vehicles, passenger vehicles, hybrid vehicles, high-performance vehicles, sport-utility vehicles, light trucks, heavy trucks, heavy-duty vehicles, and buses.

One of ordinary skill in the art would also understand that the embodiments described in this disclosure may be utilized with a variety of tread patterns, including, without limitation, symmetrical, asymmetrical, directional, studded, and stud-less tread patterns.

One of ordinary skill in the art would also understand that the embodiments described in this disclosure may be utilized, without limitation, in high-performance, winter, all-season, touring, non-pneumatic, and retread tire applications.

One of ordinary skill in the art would also understand that the embodiments described in this disclosure may be utilized in large tires. Examples of large tires include, but are not limited to, agricultural tires, mining tires, forestry tires, skid steer tires, construction tires, monster-truck tires, and other heavy-duty vehicle tires.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present disclosure has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the disclosure, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A tire structural health monitoring assembly comprising:
    a tire having a plurality of components including:
        a pair of annular beads,
        a body ply extending between the annular beads,
        a circumferential belt disposed above the body ply and extending axially across a portion of the body ply,
        a circumferential tread disposed above the circumferential belt,
        a pair of shoulders extending from opposite sides of the circumferential tread, and
        a pair of sidewalls, each sidewall extending between one of the annular beads and one of the shoulders;
    at least one radio frequency identification (RFID) tag disposed between two components of the tire, wherein the RFID tag is in contact with each of the two components; and
    an RFID reader configured to receive a response signal from the RFID tag,
        wherein, when no air is present in a region surrounding the RFID tag, the RFID reader receives a response signal at a first frequency and a first power level, and
        wherein, when air is present in the region surrounding the RFID tag, the RFID reader receives a response signal at the first frequency and a second power level different from the first power level; and
    a processor configured to identify the power level of a response signal received by the RFID reader at the first frequency, and further configured to transmit a notification when the power level of the response signal is outside a pre-determined range.

2. The assembly of claim 1, wherein:
    when no air is present in the region surrounding the RFID tag, the RFID reader receives a response signal at a second frequency different from the first frequency and a third power level, and
    when air is present in the region surrounding the RFID tag, the RFID reader receives a response signal at the second frequency and a fourth power level different from the third power level.

3. The assembly of claim 1, wherein the processor is part of the RFID reader.

4. The assembly of claim 1, wherein the processor is spaced from the RFID reader.

5. The assembly of claim 1, wherein the tire is mounted to a vehicle and the RFID reader is mounted to the vehicle proximate to the tire.

6. The assembly of claim 1, wherein the RFID reader is a handheld device.

7. The assembly of claim 1, wherein the RFID reader is mounted to a stationary object.

8. A tire comprising:
    a plurality of tire components defining a plurality of layers;
    a radio frequency identification (RFID) tag disposed between at least two of the plurality of layers,
        wherein the RFID tag is in contact with each of the at least two layers, and
        wherein the RFID tag is configured to transmit a response signal in response to receiving a request signal, such that when no air is in a region surrounding the RFID tag, a first response signal is emitted from the tire at a first frequency and first power, and such that when air is in the region surrounding the RFID tag, a second response signal is emitted from the tire at the first frequency and a second power different from the first power.

9. The tire of claim 8, wherein the RFID tag includes a plurality of RFID tags at different locations.

10. The tire of claim 8, wherein the RFID tag is disposed between a first belt and a second belt.

11. The tire of claim 8, wherein the RFID tag is disposed between a belt and a body ply.

12. The tire of claim 8, wherein the RFID tag is disposed between a retread and a carcass.

13. The tire of claim 8, wherein when no air is in the region surrounding the RFID tag, a third response signal is emitted from the tire at a second frequency and a third power, and wherein when air is in the region surrounding the RFID tag, a fourth response signal is emitted from the tire at the second frequency and a fourth power different from the third power.

\* \* \* \* \*